United States Patent [19]

Eaton

[11] 4,387,440
[45] Jun. 7, 1983

[54] MODEM CONTROL DEVICE CODE MULTIPLEXING

[76] Inventor: Michael D. Eaton, 350 Sharon Park Dr., Unit L-206, Menlo Park, Calif. 94025

[21] Appl. No.: 126,889

[22] Filed: Mar. 3, 1980

[51] Int. Cl.³ .............................................. G06F 3/00
[52] U.S. Cl. ................................................... 364/900
[58] Field of Search ... 364/200 MS File, 900 MS File; 179/6.02, 6.03

[56] References Cited

U.S. PATENT DOCUMENTS

| | | | |
|---|---|---|---|
| 3,774,164 | 11/1973 | Osterberg et al. | 364/200 |
| 3,825,905 | 7/1974 | Allen, Jr. | 364/200 |
| 3,916,384 | 10/1975 | Fleming et al. | 364/200 |
| 4,121,052 | 10/1978 | Richard | 364/900 |
| 4,125,872 | 11/1978 | Maxwell et al. | 364/900 |

*Primary Examiner*—James D. Thomas
*Assistant Examiner*—David Y. Eng
*Attorney, Agent, or Firm*—C. Michael Zimmerman

[57] ABSTRACT

A modem is described for transmitting digitally coded information between an information distribution network and a data processing unit, which modem is responsive to modem control instructions provided by the very same keyboard input providing data transmission. The modem is capable of distinguishing modem control instructions from data transmission and includes such control functions as automatic telephone answering, automatic redialing of busy numbers, and an automatic escape sequence for terminating data transmission.

6 Claims, 2 Drawing Figures

MODEM CONTROL DEVICE CODE MULTIPLEXING

BACKGROUND OF THE INVENTION

The present invention relates to a modem for transmitting digitally coded information between an information distribution network such as a telephone network, and either a central data processing unit or a remote data processing unit. More particularly, the invention relates to a modem whose operation is controllable by one of the very same data processing units for which it is designed to establish a communication link.

Modems are widely used to establish communication links between information distribution networks, e.g., telephone distribution networks, and data processing units. In general, modems modulate when transmitting and demodulate when receiving, signals usable by data processing units so that the information represented by such signals is in a form transmittable over a selected distribution network.

Present day modems provide quite reliable transmission of digitally coded information over telephone distribution networks. However, their control leaves much to be desired. Although modems provide data transmission at the quite high feed rates which can be accommodated by many data processing units, most provide few, relatively cumbersome, control options. For example, stand-alone modems, i.e., modems for use with data processing units which themselves do not have modems built in, require control separate and apart from the data processing units. Because of such, the control functions which have been made available for stand-alone modems have been quite limited. The most "sophisticated" stand-alone modem control known to applicant at the time of filing this application, merely provides automatic dialing. That is, such modem is capable of establishing a communications link over a distribution network without an operator having to actually dial the desired number on a telephone.

The control functions of even those modems which are provided as a part of a data terminal, i.e., are directly incorporated into the data terminal, leave much to be desired insofar as their control is concerned. The approach in the past has been to provide separate keys which are directly connected with the various integrated circuit chips providing modem operation. This also results in the control functions for such modems being generally quite limited.

SUMMARY OF THE INVENTION

The present invention provides a modem which is controlled directly by digitally coded modem control instructions received at one of the very same input/output ports used to provide the desired transmission of data. It accomplishes this via a code multiplexing scheme. That is, the modem interprets the context of the information presented at such port and separates digitally coded modem control instructions from digital information to be transmitted.

The modem of the invention includes, as is usual, a first port which is communicably connectable to an information distribution network, e.g., a telephone distribution network, to place thereon or receive therefrom, digitally coded and network control information; and a second port which is communicably connectable to a data processing unit to provide or receive digitally coded information from the network. It further includes means for directing digitally coded information to be transmitted by the modem received at one of the ports to the other of such ports. And in accordance with the invention, the modem of the invention also has means for controlling its operation which is responsive to digitally coded modem control instructions; and means for directing to such control means, digitally coded modem control instructions received at the second communication port. Thus, the very same data terminal which is utilized to provide the information desired to be transmitted, is also usable to control operation of the modem. An operator of such a data terminal therefore can instruct the modem to perform many relatively complex functions, without having to physically interact with the modem itself.

The modem of the invention can be instructed to automatically respond to any indication received by it over the distribution network that communication with its associated data processing unit is desired, and also to automatically dial the number of a destination on the distribution network with which its associated data processing unit wishes to communicate. These as well as other relatively more complex control functions are provided by the preferred embodiment of the invention. For example, the invention includes automatic redialing in the event when the modem attempts to establish communication it is found that the line at the destination is busy. It further provides two differing dialing modes, a fast dialing mode and a slow dialing mode. Moreover, the preferred embodiment provides an escape sequence by which data transmission by the modem can be intentionally terminated. These and other control functions are included in the preferred embodiment described below, which preferred embodiment corresponds at the time of filing the application to the best mode contemplated by the applicant of carrying out the invention.

BRIEF DESCRIPTION OF THE DRAWINGS

With reference to the accompanying two sheets of drawing.

DETAILED DESCRIPTION OF THE PREFERRED EMBODIMENT

Figure 1:
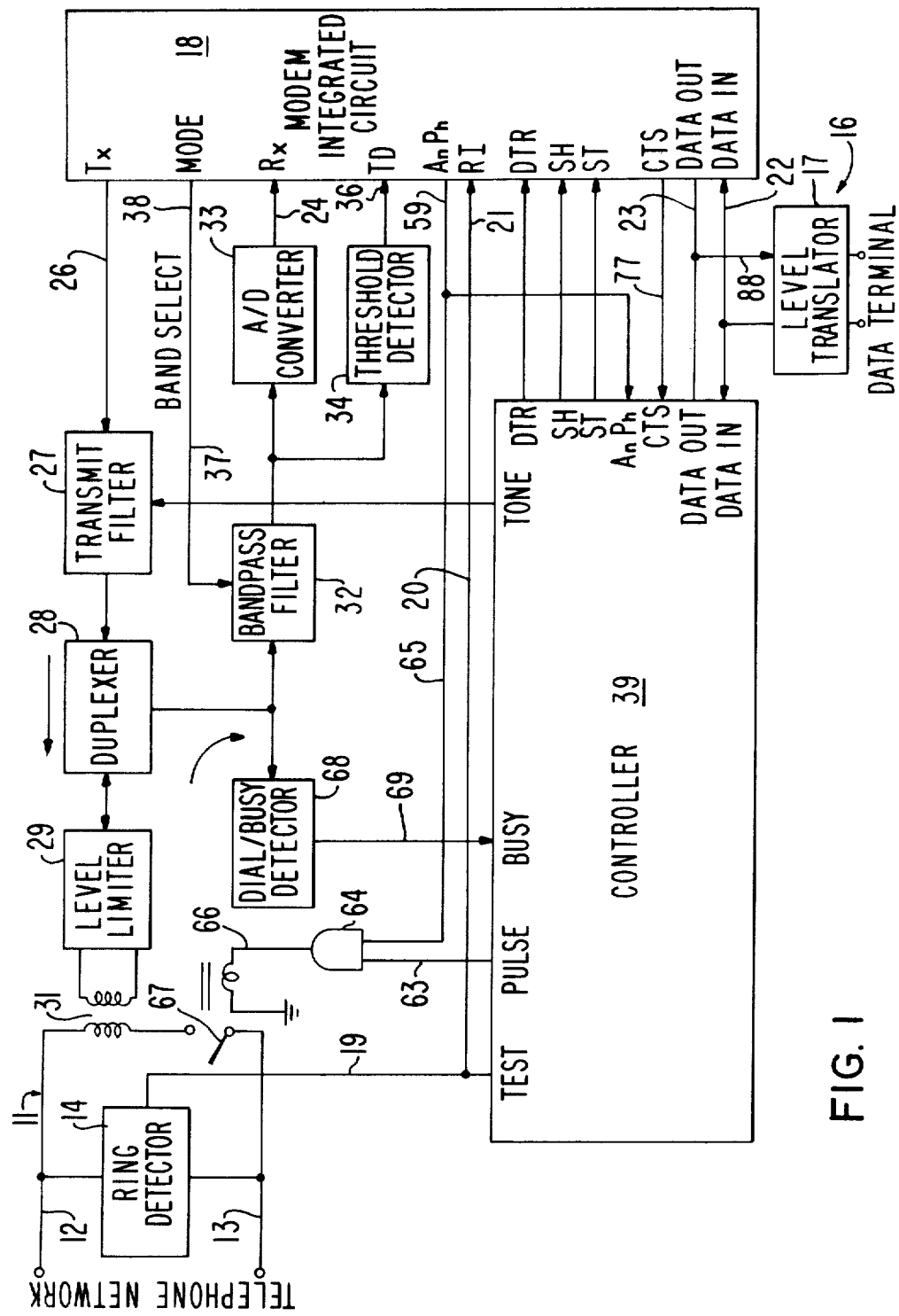
FIG. 1 is a block diagram of a preferred embodiment of the invention.

FIG. 1 is an overall logic and information flow block diagram of a preferred embodiment of the modem of the invention. It includes a conventional port for communicably connecting the same to a telephone network. Port 11 is represented by a pair of lines 12 and 13 which respectively are to be connected directly to the "tip" and "ring" lines of a telephone line. Thus, port 11 is communicably connectable to the telephone network for placing thereon and receiving therefrom, digitally coded information and network control information. Such port further includes a ring detector 14 for detecting an effort to communicate with the data processing unit which is associated with the modem, as will be described in more detail below.

The modem of the invention also includes a second port 16 which is communicably connectable to a data processing unit from which it is desired to receive data, or to which data is to be transmitted. Although the invention is particularly applicable to stand-alone modems in which the port 16 would be exterior to a data terminal, it is also applicable to modems provided as part of a data terminal. And as used herein, the term "data processng unit" is meant to encompass units whose sole function is to exchange information with the distribution network, as well as units which themselves perform operations on digital data information. Such second port includes a level translator 17 for converting the voltage level binary notation of such a data processing unit, to one to which the modem is responsive.

Conventional digital modem circuitry is also provided for receiving digitally coded information received at one of the ports 11 and 16, translating such data and directing it to the other of such ports. More particularly, a digital modem integrated circuit represented at 18 is provided for accomplishing such purposes. It can be considered as means for converting digitally coded information in digital voltage level form to a form suitable for transmission over the distribution network and for converting digitally coded information received from the distribution network into digital voltage level form. The digital modem integrated circuit chip identified as MC6860 available from Motorola Semiconductor Products, Phoenix, Ariz., is particularly suited to the instant invention. It includes in a single chip the various pin connections shown in FIG. 1, and the functions associated therewith useful for purposes of the instant invention, as will be discussed below. It should be noted that as represented by lines 19 and 20, detection of a ring by detector 14 is directly conveyed to the RI (ring indication) pin 21 of digital modem 18.

Integrated circuit 18 includes a pair of terminals 22 and 23 to respectively receive from and place at the data processing unit, digitally coded information to be transmitted; and terminals 24 and 26 for receiving from and outputting on the telephone network, analog signals representing digital information to be so transmitted. The modem of the invention also includes elements for providing reliable and appropriate communication with the telephone network. A transmit filter 27 is connected to terminal 26 and filters out from any signal received therefrom, higher order harmonics as necessary to condition the signal for placement on the network. A duplexer 28 provides direction sensitive coupling by discriminating between signals to be placed on the network and those received therefrom. Signals to be placed on the network are fed through an overload protection level limiter 29 and an inductive coupler 31 to the telephone network, whereas signals received from the telephone network by the duplexer are fed to a band pass filter 32. Such filter provides frequency discrimination to separate data signals from dial tone and busy signals as discussed herein below, and directs data signals to the receive pin 24 of the digital modem 18 via an analog to digital converter 33. The analog component of a received data signal is detected by a threshold detector 34 which places a digital signal on "threshold detector" pin 36 of digital modem 18 indicative of whether or not a signal of sufficient strength is being received from the telephone network to assure reliable communication.

It should be noted that the frequency band passed by filter 32 is determined by the mode of frequency operation of the integrated circuit 18. That is, as is represented by line 37, the frequency band width passed by filter 32 is determined by the output on the MODE pin 38 of integrated circuit 18.

Figure 2:
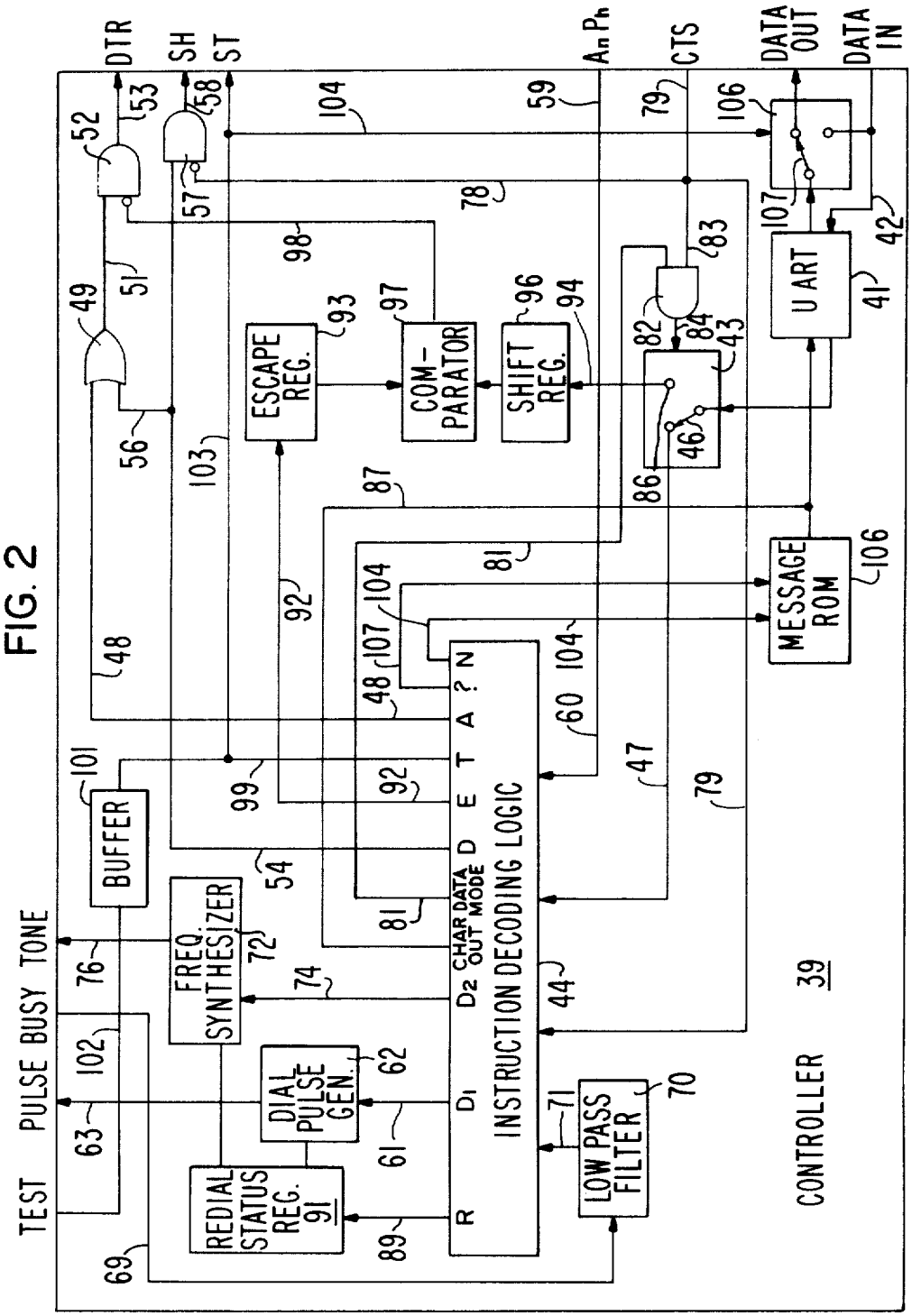
FIG. 2 is a more detailed block diagram of the controller incorporated into the preferred embodiment of the invention.

As a particularly salient feature of the modem of the invention, it includes control means which is responsive to digitally coded information received either from the communication distribution network or the data processing unit. Such control means is represented in FIG. 1 by the block 39 and is shown in detail in FIG. 2.

Controller 39 is designed to react to many different commands provided by the data processing terminal. In this connection, it includes a UART (universal asynchronous receiver/transmitter) 41 which is, in effect, the interface between the remainder of the controller and modem control instructions provided at port 16. UART 41 functions as is conventional, to organize digital data received by it into the serial vectors of information (bytes) utilizable by the controller 39. It is connected to direct data received by it on line 42 from translator 17 (FIG. 1) to an electronic switch represented at 43. When the modem is first turned on, standard power-up logic (not shown) automatically causes switch 43 to direct digital information received from UART 41 to instruction decoding logic 44, as represented by the illustrated location of switch throw 46 and line 47. The algorithm for instruction decoding logic 44 will be understood from the following description of command operation. As a general matter, such decoding logic is designed to interpret each of the command instructions and command information it receives to effect the operation represented by such command or information.

The preferred embodiment of the invention is designed to recognize and effect twelve different commands as follows:

COMMAND INSTRUCTIONS

A = auto answer
D = dialing
F = fast dialing (tone dialing)
W = slow dialing (dial pulse dialing)
R = repeat dialing
E = escape sequence
T = self test
N = display stored number
P = prompt command
? = information
K = kill command
Z = reset The letters set forth above correspond to the digital representation of such letters provided on a standard data terminal keyboard. An operator need only depress the same letter or symbol on such keyboard used during data transmission to direct to the port 16 and, hence, to the controller 39, the digital representation of the command associated with each. It should be noted that the controller is set to interpret depression of the carriage return key as a delimiter (end of instruction or command information).

To facilitate understanding, the details of controller 39 will be described in connection with its reaction to each of the above commands, considered in order. And for the sake of simplicity, a voltage level which activates or readies subsequent logic or circuitry is referred to below as a "true" signal, whereas a digital voltage level which deactivates subsequent logic or circuitry, is referred to as a "false" signal.

Controller 39 reacts to an "A" command by readying the modem to automatically respond to a call received on the distribution network, by communicating distribution network port 11 with the data terminal port 16 for the transmission of digitally coded information. That is, decoding logic 39 responds to the placement of an "A" instruction on line 47, by changing the state of the output to which line 48 is connected to "true", which line is connected to one terminal of an OR gate 49 which, in response thereto, places a "true" output on output line 51. As illustrated, line 51 is connected to the "true" input of a NAND gate 52. The "false" input of NAND gate 52 will always be at a level representing "false" except upon receipt of an "escape" signal as discussed below. Thus, receipt by NAND gate 52 of a "true" signal on its "true" input will result in its output represented by line 53 correspondingly going "true", with the result that the DTR (data terminal ready) pin of the digital modem 18 is activated. Thus, whenever a ring indication is received on RI pin 21 and the TD pin subsequently receives a "true" signal, data communication with the network via pins $R_x$ and $T_x$ is automatically enabled.

When the modem of the invention is in the command mode and it receives a digital signal representative of the "D" key of the terminal keyboard being depressed, followed by a number, it reacts thereto by furnishing to the distribution network, the appropriate signal for dialing the destination on such network at which it is desired to communicate. Moreover, it accomplishes this function in two different dialing modes, depending upon which of the terminal keys "F" or "W" was last pressed. More particularly, decoding logic 44 responds to the placement on line 47 of a "D" command by placing a "true" output on line 54. This "true" signal is directed via line 56 to OR gate 49 and, hence, through AND gate 52 as discussed above resulting in the activation of the DTR input pin of the integrated circuit 18. The true signal on line 54 is also fed to the "true" input of NAND gate 57. The "false" input of such NAND gate is maintained at a level representing "false", except when data is being transmitted through the modem between the ports 11 and 16. thus, the receipt by NAND gate 57 of the "true" signal on line 54 will result in its output represented at 58 also going "true", which output is connected to the SH (switch hook) input pin of the circuit 18. Such circuit will react to the simultaneous activation of its DTR and SH inputs by placing a "true" output on its AnPh (answer phone) output pin represented at 59. Such "true" signal on output pin 59 will be conveyed via line 60 to decoding logic 44, which logic reacts thereto be requesting receipt of a dial tone signal from the telephone network. That is, it places a "true" signal on line 61 which will be passed through dial pulse generator 62 and line 63 to one of the inputs of AND gate 64. The other input of AND gate 64 is connected directly via line 65 to the AnPh output pin 59. The result is that the output of such AND gate 64 will apply a "true" signal on line 66 which causes relay 67 to close and thereby indicate to the central distribution office on the telephone network that a dial tone is requested. It should be noted that the AnPh pin connection of circuit 18 will remain at a "true" state during the remainder of the dialing procedure and during data transmission as set forth below.

Upon being received by the modem, the dial tone is fed via level limiter 29 and duplexer 28 to the dial/busy detector 68 (FIG. 1). Detector 68 responds to the receipt of such a dial tone signal by placing a "true" signal on line 69 which communicates via a low pass filter 70 and line 71 with decoding logic 44. The decoding logic responds to simultaneous "true" signals on input lines 60 and 71 by directing digital signals representative of the telephone number (destination) desired to be placed on the distribution network, by causing such placement. As mentioned previously, the control means is capable of generating and delivering a telephone number to the distribution network in two different dialing modes, either a numerically coded destination signal or a tone coded destination signal. Thus, it includes both the dial pulse generator 62 and a frequency synthesizer 72. If the last dialing speed command was a "W" representing slow dialing, the decoding logic 44 will react to a simultaneous "true" signal on lines 60 and 71 by placing an activating "true" signal on its output line 61 directed to dial pulse generator 62. The dial pulse generator will respond thereto by generating the pulsing representation of the number to be dialed and passing the same via line 63 and AND gate 64 (FIG. 1) to pulse operate relay 67 and place at the port 11, the number to be applied to the telephone network. In this connection, dial pulse generator 62 includes a register for storing the data representation of the last telephone number fed into instruction decoding logic 44.

If the last dialing speed key depressed was the "F" key indicating fast dialing, the decoding logic 44 will react to simultaneous "true" signals on lines 60 and 71 by outputting a "true" signal on its output line 74 directed to frequency synthesizer 72. Synthesizer 72 is similar to dial pulse generator 62 in that it includes a register to store the data representation of the last telephone number received on line 47 by decoding logic 44. Frequency synthesizer 72 therefore will react to the placement of a "true" signal on line 74 by generating the tonal representation of the telephone number of the destination desired on the telephone network. Such tonal representation is fed as represented by line 76 to transmit filter 27 which after converting the digital tone to a sinusoidal signal by removing harmonics therefrom, directs the same to port 11 via duplexer 28, level limiter 29, and coupling 31.

If the data processing unit at the destination contacted via the above application of its number on the network responds by indicating that it is ready to communicate with a data terminal, it will in accordance with conventional practice apply to the telephone network for receipt by the port 11, a signal representative of such fact. Such signal will be passed through the coupler 31, level limiter 29 and, via the duplexer 28, through the band pass filter 32. Such signal will be directed through the threshold detector 34 to the TD pin of circuit 18 to indicate that the received signal is strong enough for reliable communication. That is, such modem will react to a "true" signal on pin TD by activating both its $R_x$ input pin and its CTS (clear to send) output pin. The application of a "true" signal at the CTS output pin will be sensed as represented by lines 77 and 78 by the "false" input of NAND gate 57. This will inactivate NAND gate 57 with the result that the SH pin of integrated circuit 18 correspondingly becomes deactivated.

The application of a "true" signal at the CTS output pin will also be sensed as represented by lines 77 and 79, by decoding logic 44. Such logic will respond thereto by placing a "true" signal on output line 81 directed to an input of AND gate 82. The "true" signal applied to the CTS line is also directed to the other input of AND gate 82 via line 83, with the result the AND gate will respond to its inputs by applying a "true" signal to its output line represented at 84. Such output line is connected to electronic switch 43 so that the application of a "true" signal on line 84 will result in switch throw 46 being thrown to pole 86 so that during data transmission, the data is directed through pole 86 to data mode "escape" structure to be discussed herein below. This movement of throw 46 will also deactivate the decoding logic 44 so that subsequent digitally coded information received by the controller 39 will be identified as data to be transmitted by the modem, rather than modem control instructions.

Upon the simultaneous activation of the DTR, TD, SH, and CTS pins of the integrated circuit 18, it will transmit between its digital data input and output pins, the data to be transmitted between the two ports of the modem.

If when a telephone number is applied by the modem to the telephone network, a "busy" signal is returned, such a busy signal will be fed via coupler 31, level limiter 29 and duplexer 28 to detector 68 which upon detecting the same will place on line 69 a "true" signal. It should be noted that the band widths of filter 32 which are passed, are selected to discriminate against such a busy signal and prevent the same from causing threshold detector 34 from activating TD pin of circuit 18.

Low pass filter 70 will react to receipt of such a busy signal by applying a "true" digital signal to line 71 to be fed to decoding logic 44. The sequence at which decoding logic 44 receives "true" signals on line 71 enables it to distinguish between such a signal representing the receipt of a dial tone and such a signal representative of a busy line. That is, a dial tone "true" signal is received prior to application of the telephone number to the telephone network, whereas a "true" signal representative of a busy line will be received by the decoding logic after the telephone number is applied to the telephone network.

Decoding logic 44 reacts to placement of a busy "true" signal on line 71 in two differing ways, depending upon its dialing instructions. If it had been instructed merely to dial the number as described above, it reacts to such a receipt of a busy signal by placing on "character output" line 87, the digital representations required to feed through UART 41 to the data terminal via line 88 (FIG. 1) and level translator 17, digital representations of characters to be displayed to the data terminal operator, indicative of the message that communication with the location is incapable of being established at the time. For example, the message "NO CONNECTION" can be directed to be displayed by the data terminal to such operator.

As mentioned previously, one of the principal features of the instant invention, is its ability upon receipt of a busy signal to redial a number after a preselected period of time. The modem of the invention is directed to effect such redialing if necessary, merely by depressing the "R" command before the number to be dialed, rather than the "D" command. When the "R" command is so depressed and its digital representation is received by decoding logic 44, the decoding logic responds thereto by placing a "true" signal on line 89 in addition to the various outputs and responses described above in connection with receipt by it of a "D" instruction. This placement of a "true" signal on line 89 results in a one-bit register 91 being activated to cause the dialing mode and generation of a dialing signal to be repeated upon receipt of a busy "true" signal. In this connection, it should be remembered that both the dial pulse generator 62 and the frequency synthesizer 72 include registers storing the last dialed number.

If the decoding logic 44 receives a busy "true" signal on line 71 and redial status register 91 is activated as aforesaid, the decoding logic will react thereto by causing a sequence of dialings to occur, spaced a preselected period of time (for example, 100 milliseconds apart) from one another, rather than place digital representation of characters indicating "busy" on line 87. Such redialing will continue for a selected time, e.g., two minutes, and if communication with the destination on the distribution network being telephoned is not completed during such time, the decoding logic 44 then will place on line 87 the character digital representations indicating that communication has not been established.

As another salient feature of the modem of the invention, it includes means enabling escape from the data transmission mode and reversion to the modem command control mode. While the modem of the invention is in data transmission mode, the controller activates a listening process whereby data that is to be transmitted by the modem is serially compared to an escape sequence. If the comparison is true, data transmission will be halted and the modem will return to command mode. More particularly, as mentioned previously, during data transmission throw 46 of switch 43 is connected to terminal 86. Thus, during data transmission digital representations of the data being transmitted are fed via a line 94 to a shift register 96. Shift register 96 acts to place such data representations in a serial form for comparison by a comparator 97 with the contents of an escape register 93. Upon a "true" comparison, the output line 98 of the comparator will have a "true" signal applied thereto. As illustrated, such line is connected to the "false" input of NAND gate 52 so that the application of such a "true" signal on line 98 will result in the application of a corresponding "false" signal on output line 53. The DTR pin of the integrated circuit 18 is thus deactivated, terminating data communication via such integrated circuit.

The CTS output pin of the circuit 18 will be inactivated by the inactivation of DTR pin, with the result that AND gate 82 will direct throw 46 of switch 43 to again communicate information it receives to decoding logic 44, rather than to shift register 96. Moreover, deactivation of such CTS pin will be fed by line 79 to decoding logic 44 which will react thereto by placing on character output line 87 a "NO CONNECTION" message to be displayed at the data terminal. This will inform the operator of the discontinuance of data transmission.

The "E" command is used to reprogram the escape sequence stored in the escape register. That is, receipt by the decoding logic while the modem is still in the command mode, of the digital representation of an "E" command followed by an alphanumeric sequence will result in a digital representation of such sequence being applied to output line 92 and, hence, being stored in escape register 93.

The modem of the invention also reacts to a "self-test" instruction by directing integrated circuit 18 to assure that it is capable of proper data transmission. More particularly, upon receipt by the decoding logic on line 47 of a "T" command, such decoding logic reacts thereto by placing a "true" signal on output line 99. Such "true" signal is, among other things, directed through a time delay buffer 101 and line 20 (FIG. 1) to RI (ring indicator) pin 21 of circuit 18. Thus, the modem is provided with an indication that an effort is being made to communicate with the same. The decoding logic 44 also reacts to receipt of a "T" instruction by otherwise performing the functions associated with answering a call as discussed above. Moreover, the "true" signal on line 99 is directed by line 103 to the ST (self-test) pin of circuit 18 to initiate the self-testing operation. The "true" signal on line 99 is also directed via line 103 and line 104 to an electronic switch 106 to disconnect throw 107 with the data output terminal to the data input terminal of the circuit to direct data appropriately to the integrated circuit 18 for the self-test. That is, the normal data-in line 42 becomes a data output line. In this connection, the decoding logic 44 is designed to ignore looped-back digital information received by it because of such switching of the electronic switch 106.

A message indicative of proper functioning of the modem is then fed by controller 39 into modem integrated circuit 18 where, assuming proper functioning of such modem, it is placed on the $T_x$ pin of such modem. It is then directed through the duplexer 28 which has sufficient leakage to allow a representation of the same to be directed to band pass filter 32. This will result in receipt of the message by $R_x$ pin through A/D converter 33, which message will then be retranslated by integrated circuit 18 and applied to its data output pin 23 for subsequent delivery through the level translator 17 to the data terminal. If all of the circuitry through which such message has passed in the modem is properly functioning, the data terminal will display such message as originally transmitted.

The "true" signal applied by the decoding logic 44 to its output line 99 is applied long enough for a reliable self-test by circuit 18. It is then terminated with the result that the decoding logic again places the "prompt" message on line 87 for conveying to the data terminal for an indication that it is awaiting further instructions.

Besides the major commands discussed above, the modem of the invention also is designed to respond to simpler commands typically desired by a data terminal operator. For one, decoding logic 44 responds to the application of a "N" command to line 47 by directing through output line 104 and message ROM 106, that the last telephone number which had been received by the controller via the command instruction be displayed on the data terminal display. Moreover, the decoding logic 44 responds to a "P" command followed by additional information by storing the additional information as a "prompt" symbol to be displayed on the data terminal. It also responds to a "question mark" command received on the line 47 by placing a "true" signal on line 107 to cause message ROM 106 to deliver to UART 41, the digital representations necessary to print out on the data terminal, a table setting forth the twelve different command instructions set forth herein.

Decoding logic 44 responds to a "K" command on line 47 by terminating a particular command instruction received by it and returning to its state immediately prior to such command. A "Z" command is decoded to cause return of the modem command to its state existing at the time the modem was initially powered-up for operation.

The logic portion of the modem of the invention can be implemented as either hard-wired logic circuitry or as a logic-replacement, single-chip microcomputer. This latter approach is preferred as the best mode of the invention, in view of it being most cost-effective.

In one embodiment of the invention, the controller was implemented through the microcomputer designated by the model number 3870 available from various sources, including Mostek Corporation, Carrollton, Tex.; Fairchild Camera and Instrument Corporation, Mountain View, Calif.; and Motorola Semiconductor Products, Phoenix, Ariz. The firmware stored in the microcomputer implementation of the controller as described above is defined by the following tabulation stored in ROM memory of such microcomputer between hexadecimal addresses 000 and 7FF:

```
000   70 B1 71 B4   20 80 B0 2A   04 DA A4 21   02 84 03 79
 10   8E 66 6F 16   5E 25 00 84   06 0A 25 37   94 F6 90 5F
 20   2B 58 1E 70   CB 81 07 A0   23 80 B0 90   4E 44 18 81
 30   0E 34 21 07   94 15 45 12   55 A6 C5 55   90 0D A6 91
 40   0A 70 CB 20   4A 94 03 24   F8 54 46 18   81 25 36 21
 50   07 94 20 46   25 56 84 0B   47 22 FE 18   B4 47 12 57
 60   90 11 70 B4   72 FB 94 0B   71 FB 46 94   03 24 F8 24
 70   FB 56 44 F6   20 6A 81 02   71 B6 1D 48   1B 1C 67 6E
 80   2A 04 E5 A4   21 04 84 03   75 8E 16 5E   25 00 94 FB
 90   65 6F 7A 5C   62 6C 5E A1   21 20 5E 70   5E 2B 90 03
 A0   90 80 20 53   B7 71 5B A4   21 E0 84 17   25 80 94 08
 B0   20 E3 B7 72   5B 90 76 25   40 94 72 20   BA B7 70 5B
 C0   90 6B 7F 51   A6 81 FE 20   14 50 28 04   61 31 94 F5
 D0   70 B7 20 D8   B6 A6 91 FE   A6 81 FE 70   B6 A7 18 24
 E0   03 B7 91 12   24 D0 91 BB   24 F2 91 3A   24 F7 81 06
 F0   20 53 B7 90   38 A7 25 7F   84 09 24 80   91 28 24 F4
100   81 06 20 A/   B7 90 26 24   FE 91 1B 24   F3 81 08 20
 10   BA B7 70 5B   90 17 24 F6   91 0E 24 D8   81 85 20 E3
 20   B7 72 5B 90   08 A7 50 12   12 C0 1F B7   A7 5C 20 FF
 30   0B 54 34 56   20 80 50 28   04 61 70 B1   2A 04 EF 28
 40   04 6C 67 6F   28 04 7F 66   28 04 8C 0A   25 30 84 06
 50   4E 25 00 94   F4 67 6F 28   04 83 A0 21   10 84 04 29
```

```
 60  04 1D 44 18   94 F5 28 04   A6 25 0D 84   EE 28 04 8C
 70  4C 21 DF 50   A4 21 08 94   0D 40 25 41   94 08 62 6A
 80  75 B1 5C 90   BE A4 21 10   40 94 1D 25   44 94 04 29
 90  02 6F 25 52   94 06 71 53   29 02 71 25   4E 94 09 28
 A0  04 83 28 04   B6 90 DD 25   1B 94 03 90   8E A1 21 20
 B0  40 84 12 25   57 94 04 70   90 06 25 46   94 07 71 62
 C0  6B 5C 90 C0   25 5A 94 03   71 B5 A1 21   80 40 84 05
 D0  25 54 84 73   25 4B 94 08   70 B1 62 6A   5C 90 A5 25
 E0  45 94 09 20   1E 51 20 20   5A 90 2C 25   50 84 22 21
 F0  EF 25 0F 94   14 2A 05 7E   16 25 00 84   E1 5C 28 04
200  8C 44 18 94   F4 34 90 D6   2A 05 0C 28   04 6C 90 9C
 10  20 1F 51 20   18 5A 41 0B   28 04 83 28   04 A6 28 04
 20  8C 4E 25 1B   84 1B 25 0A   84 03 8F F0   41 0B 4C 50
 30  0A CA 0B 40   25 0A 94 05   70 5C 90 05   5E 31 8F ED
 40  63 6F 7A 5C   90 C1 20 54   B1 2A 05 39   28 04 6C 20
 50  28 5A 20 64   50 28 04 61   3A 94 F6 20   5C B1 28 04
 60  6C 70 50 28   04 61 B1 A0   21 08 84 FC   29 04 0C 70
 70  53 70 52 28   04 83 20 2F   51 28 04 A6   25 1B 94 07
 80  65 6F 7A 5C   90 BF 25 0D   94 0A 70 E2   94 06 28 04
 90  B6 90 3E 71   52 28 04 8C   4C 25 2D 84   DD 25 2A 84
 A0  0D 25 0A 84   09 24 D0 91   21 24 F6 81   1D 41 25 14
 B0  91 09 2A 05   15 28 04 6C   90 CB 4C 50   41 0B 40 5C
 C0  31 25 0A 84   0C 67 6F 90   B1 41 0B 7A   5C 29 02 08
 D0  65 6F 4C 25   0A 94 09 2A   05 57 28 04   6C 90 A6 77
 E0  B1 28 04 40   0A 52 44 18   94 04 29 03   DB 42 0B 4C
 F0  25 0A 84 79   25 2A 94 06   28 04 40 90   31 24 D0 50
300  62 6B 70 CC   94 2B C0 94   02 7A 51 77   5A 20 64 50
 10  28 04 61 3A   94 F8 A1 21   FE B1 20 3D   50 28 04 61
 20  A1 22 01 B1   20 27 50 28   04 61 31 94   EA 32 90 B7
 30  40 13 2A 05   68 8E 16 B7   16 07 20 4A   B6 4B 22 80
 40  5B 1B 20 BC   5A 03 51 31   94 FE 1A A0   23 40 B0 1B
 50  03 51 3A 94   F3 1A 62 69   4C B7 4B 21   7F 5B 28 00
 60  21 20 80 B0   20 64 50 28   04 61 90 C2   20 4D 5A 70
 70  52 20 50 57   20 40 51 A0   21 10 94 2D   44 18 84 5C
 80  72 50 28 04   61 28 04 2C   94 07 37 84   0A 20 40 51
 90  32 94 E5 3A   94 E2 71 E3   94 42 70 B1   50 7D 5A 28
 A0  04 61 3A 94   FB 29 02 D0   75 B1 2A 05   29 28 04 6C
 B0  20 B4 50 28   04 61 7D B1   28 04 6C 46   18 94 FD 75
 C0  B1 67 6E A0   21 10 84 14   44 18 94 F8   45 34 21 7F
 D0  EE 94 EF 8F   03 90 05 70   EC 94 E9 A1   21 F9 B1 70
 E0  50 51 28 04   61 28 04 61   2A 05 35 28   04 6C A0 21
 F0  08 94 09 75   50 28 04 61   31 94 F4 70   B1 50 7B 5A
400  28 04 61 3A   94 FB 2A 05   26 28 04 6C   62 6A 70 CC
 10  84 03 75 B1   44 25 FE 84   02 34 29 01   42 2A 05 29
 20  28 04 6C 46   18 94 FD 2A   05 7C 90 BB   08 A0 21 04
 30  94 03 20 FC   18 1F C1 51   14 18 1F C1   51 14 12 0C
 40  08 00 06 01   07 20 40 51   28 04 2C 94   08 20 64 50
 50  28 04 61 0D   20 19 50 28   04 61 44 18   94 EB 29 03
 60  DB 08 20 52   24 FF 94 FD   30 94 F8 0C   08 00 06 01
 70  07 67 6F 16   25 00 94 02   0D 5C 28 04   8C 90 F5 08
 80  7D 90 07 08   20 20 90 02   7A 5C 90 02   08 46 18 94
 90  FD 70 CB 4C   94 03 22 80   18 57 1A 20   57 56 28 00
 A0  21 7D EC 84   E4 0C 08 44   18 94 FD 70   CB 45 94 02
 B0  12 34 21 7F   5C 0C 08 00   06 01 07 20   30 50 30 40
 C0  0B 4C 25 0A   94 10 0A 25   2F 94 0A 2A   05 57 28 04
```

```
D0  6C 29 01 42  0D 28 04 8C  90 E5 42 49  5A 43 4F 4D
E0  50 3A 00 3E  00 11 15 09  14 00 42 4F  5A 4F 00 0D
F0  50 72 65 73  73 20 3F 20  66 6F 72 20  63 6F 6D 6D 500 61 6E 64 20  73 75 6D 6D  61 72 79 00  20 49 6E 76
 10 61 6C 69 64  00 20 54 6F  6F 20 6D 61  6E 79 20 64
 20 69 67 69 74  73 00 20 4E  4F 20 43 4F  4E 4E 45 43
 30 54 49 4F 4E  0D 07 00 3E  00 0D 53 65  6C 66 20 54
 40 65 73 74 2D  2D 00 66 75  6C 6C 79 20  66 75 6E 63
 50 74 69 6F 6E  61 6C 00 4E  6F 20 73 74  6F 72 65 64
 60 20 6E 75 6D  62 65 72 00  96 29 A5 3A  96 39 87 37
 70 A5 34 96 33  87 32 A5 2F  96 2E 87 2D  3C 00 0D 0D
 80 0D 20 20 20  20 20 20 20  20 20 20 20  43 20 4F 20
 90 4D 20 4D 20  41 20 4E 20  44 20 20 20  20 20 20 20
 A0 53 20 55 20  4D 20 4D 20  41 20 52 20  59 0D 0D 0D
 B0 54 68 65 72  65 20 61 72  65 20 31 32  20 63 6F 6D
 C0 6D 61 6E 64  73 2C 20 65  61 63 68 20  61 63 74 69
 D0 76 61 74 65  64 20 62 79  20 70 72 65  73 73 69 6E
 E0 67 20 61 20  73 69 6E 67  6C 65 0D 61  6C 70 68 61
 F0 20 6B 65 79  3A 0D 0D 20  20 20 20 44  2C 20 52 2C 600 20 4E 20 20  20 3D 3D 3D  3D 3E 20 20  22 44 69 61
 10 6C 69 6E 67  22 20 63 6F  6D 6D 61 6E  64 73 0D 20
 20 20 20 20 20  20 20 46 2C  20 57 20 20  20 3D 3D 3D
 30 3D 3E 20 20  20 44 69 61  6C 69 6E 67  20 63 6F 6E
 40 74 72 6F 6C  0D 20 20 20  20 20 20 20  20 20 20 41
 50 20 20 20 3D  3D 3D 3D 3E  20 20 20 41  75 74 6F 6D
 60 61 74 69 63  20 61 6E 73  77 65 72 69  6E 67 0D 20
 70 20 20 20 20  20 20 20 20  20 4B 20 20  20 3D 3D 3D
 80 3D 3E 20 20  20 44 69 73  65 6E 67 61  67 65 20 61
 90 75 74 6F 2D  61 6E 73 77  65 72 0D 20  20 20 20 20
 A0 20 20 50 2C  20 45 20 20  20 3D 3D 3D  3D 3E 20 20
 B0 20 54 65 72  6D 69 6E 61  6C 20 63 6F  6E 74 72 6F
 C0 6C 0D 20 20  20 20 20 20  20 20 20 20  54 20 20 20
 D0 3D 3D 3D 3D  3E 20 20 20  53 65 6C 66  2D 74 65 73
 E0 74 0D 20 20  20 20 20 20  20 20 20 20  5A 20 20 20
 F0 3D 3D 3D 3D  3E 20 20 20  52 65 73 65  74 0D 20 20

700 20 20 20 20  20 20 20 20  3F 20 20 20  3D 3D 3D 3D
 10 3E 20 20 20  49 6E 66 6F  72 6D 61 74  69 6F 6E 0D
 20 0D 53 6F 6D  65 20 63 6F  6D 6D 61 6E  64 73 20 6D
 30 61 79 20 6E  6F 74 20 62  65 20 69 6D  70 6C 65 6D
 40 65 6E 74 65  64 20 6F 6E  20 74 68 69  73 20 6D 6F
 50 64 65 6C 2E  0D 44 20 61  6E 64 20 52  20 63 6F 6D
 60 6D 61 6E 64  73 20 61 72  65 20 66 6F  6C 6C 6F 77
 70 65 64 20 62  79 20 61 20  70 68 6F 6E  65 20 6E 75
 80 6D 62 65 72  2E 0D 54 68  65 20 2A 20  73 79 6D 62
 90 6F 6C 20 63  61 75 73 65  73 20 61 20  70 61 75 73
 A0 65 20 66 6F  72 20 61 6E  6F 74 68 65  72 20 64 69
 B0 61 6C 20 74  6F 6E 65 2E  0D 50 72 65  73 73 69 6E
 C0 67 20 74 68  65 20 52 45  54 55 52 4E  20 6B 65 79
 D0 20 69 6E 69  74 69 61 74  65 73 20 64  69 61 6C 69
 E0 6E 67 2C 20  77 68 69 6C  65 20 45 53  43 20 0D 61
 F0 62 6F 72 74  73 20 64 69  61 6C 69 6E  67 2E 0D 00
```

Although the invention has been described in connection with a preferred embodiment thereof, it will be appreciated by those skilled in the art that various changes and modifications can be made without departing from the same. For example, code multiplexing as described above can find use in modems incorporated directly into data processing terminals. Thus, it is intended that the coverage afforded applicant be limited only by the spirit of the invention as defined in the claims and their equivalent language.

I claim:

1. A modem for transmitting digitally coded data between an information distribution network and a data processing unit, comprising:
   a modulator/demodulator for converting a signal providing digitally coded data in discrete voltage step level form to a modulated signal form suitable for transmission over said distribution network, and for converting an modulated signal received from said distribution network representing digitally coded data into a discrete voltage step level form signal;
   first port means communicably connectable to said distribution network to place thereon analog signals representing digitally coded data and network control information, or receive therefrom analog signals representing digitally coded data and network status information;
   second port means communicably connectable to said data processing unit to provide serially thereto over the same lines a signal providing digitally coded data and network status information, or receive serially therefrom over the same lines a signal to be modulated representing digitally coded data, network control instructions, and modem control instructions;
   means in electronic communication with said first and second port means and with said modulator/demodulator for transmitting digitally coded information to be transmitted by said modem and received at one of said first and second port means, through said modulator/demodulator to the other of said first and second port means; and
   means in electronic communication with said transmitting means for controlling communication of digitally coded data between said first and second port means of said modem, which means is responsive to digitally coded modem control instructions received at one of said port means and includes:
   means for segregating digitally coded modem control instructions received at said second port means serially with other digitally coded information received thereat from such other digitally coded information;
   means to compare digitally coded data being transmitted via said modem with a selected escape signal; and
   means responsive to a true comparison between transmitted information and said escape signal by terminating communication via said modem between said ports.

2. A modem according to claim 1 wherein said network status information receivable at said first port means may include a signal representing a ring, and said communication control means includes means responsive to receipt of a modem control instruction indicating automatic answering, by readying said modem to automatically transmit digitally coded data received at said first port means to said second port means upon receipt at said first port means of a ring signal.

3. A modem according to claim 2 further including means as part of said modem for generating a network control signal representative of a particular destination on said distribution network for digitally coded data received at said second port means, and wherein said communication control means further includes means for placing said network control signal at said first port means.

4. A modem according to claim 3 wherein said means for generating a network control signal includes:
   means for generating and delivering to said first port means, a network control numerically coded destination signal;
   means for generating and delivering to said first port means a network control tone coded destination signal; and
   means for selectively activating either said numerically coded signal generating means or said tone coded signal generating means to generate and deliver to said first port means a signal representative of a particular destination on said distribution network with which it is desired to communicate for the transmission of digitally coded data.

5. A modem according to claim 1 wherein said communication control means includes instruction decoding logic as part of said modem; and said means for segregating digitally coded modem control instructions received at said second port means from other digitally coded information received thereat, includes an electronic switch which directs digitally coded modem control instructions received by said modem at said second port means to said instruction decoding logic.

6. A modem according to claim 5 wherein said instruction decoding logic is provided by a microcomputer included as part of said modem.

* * * * *

REEXAMINATION CERTIFICATE (484th)
United States Patent [19]
Eaton

[11] B1 4,387,440

[45] Certificate Issued Apr. 8, 1986

[54] MODEM CONTROL DEVICE CODE MULTIPLEXING

[75] Inventor: Michael D. Eaton, Menlo Park, Calif.

[73] Assignee: Business Computer Corp., Sunnyvale, Calif.

Reexamination Reqs:st:
No. 90/000,703, Jan. 3, 1985
No. 90/000,777, May 10, 1985

Reexamination Certificate for:
Patent No.: 4,387,440
Issued: Jun. 7, 1983
Appl. No.: 126,889
Filed: Mar. 3, 1980

[51] Int. Cl.$^4$ .................... G06F 3/00; H04M 11/00
[52] U.S. Cl. ............................. 364/900; 179/2 DP
[58] Field of Search .................. 179/2 A, 2 DP, 6.02, 179/6.03; 364/200 MS File, 900 MS File

[56] References Cited
U.S. PATENT DOCUMENTS

| | | | |
|---|---|---|---|
| 3,571,512 | 3/1971 | Quiros | 178/58 |
| 3,624,632 | 11/1971 | Ophir | 340/324 A |
| 3,626,105 | 12/1971 | DeJean et al. | 179/18 ES |
| 3,644,896 | 2/1972 | Chaddha | 340/172.5 |
| 3,774,164 | 11/1973 | Osterberg et al. | 364/200 |
| 3,825,905 | 7/1974 | Allen, Jr. | 364/200 |
| 3,838,219 | 9/1974 | Mason | 179/179 DP |
| 3,842,207 | 10/1974 | Fretwell | 179/2 DP |
| 3,852,531 | 12/1974 | Fretwell et al. | 179/2 DP |
| 3,885,108 | 5/1975 | Zock | 179/90 B |
| 3,889,109 | 6/1975 | Blessin | 235/153 AK |
| 3,916,384 | 10/1975 | Fleming et al. | 364/200 |
| 3,932,709 | 1/1976 | Hoff et al. | 179/90 K |
| 3,975,712 | 8/1976 | Hepworth et al. | 340/147 R |
| 3,979,719 | 9/1976 | Tooley et al. | 340/146.1 |
| 3,984,637 | 10/1976 | Caudill et al. | 179/2 DP |
| 4,007,449 | 2/1977 | Vercesi | 340/172.5 |
| 4,012,719 | 3/1977 | Law et al. | 364/200 |
| 4,031,518 | 6/1977 | Holloran et al. | 364/200 |
| 4,058,672 | 11/1977 | Crager et al. | 178/3 |
| 4,058,838 | 11/1977 | Crager et al. | 358/257 |
| 4,069,392 | 1/1978 | Goldenberg et al. | 178/58 R |
| 4,071,887 | 1/1978 | Daly et al. | 364/200 |
| 4,076,961 | 2/1978 | Holsinger et al. | 179/2 DP |
| 4,086,434 | 4/1978 | Bocchi et al. | 179/2 AM |
| 4,093,981 | 6/1978 | McAllister et al. | 364/200 |
| 4,121,052 | 10/1978 | Richard | 364/900 |
| 4,125,872 | 11/1978 | Maxwell | 364/900 |
| 4,181,941 | 1/1980 | Godsey | 364/200 |
| 4,225,919 | 9/1980 | Kyu et al. | 364/200 |
| 4,259,563 | 3/1981 | Madeley | 219/121 LJ |
| 4,394,649 | 7/1983 | Suchoff et al. | 340/711 |

OTHER PUBLICATIONS

Hayes Microcomputer Products Inc. "Hayes Micro Modem II Owner's Manual", 1981, pp. 3–65.
Hayes Associates, Inc. "Micro Modem II for the Apple II Personal Computing System", 1978.
Omnitec Data Brochure for Model 43 with TWX-DDD Modem, 1979.
Omnitec Data Brochure for Model 9113 B Modem, 1979.
Vadic Operation and Service Manual for VA831B RS232C Adaptor, Manual No. 18008-019, Dec. 1, 1977.
Tim Pugh, "Intelligent Terminal Implementation for the S-100 Bus", Doctor Dobb's Journal of Computer Calisthenics, 1978.
An Advertisement for North Star Computers Published in Personal Computing Magazine, Apr., 1978.
Held, Gilbert "Data Communications Procurement Manual", pp. 105–111.
Martin, James "Telecommunications And The Computer", 2nd Edition, pp. 43–68.
Glasgal, Ralph "Basic Techniques In Data Communications", pp. 80–92.
McGraw-Hill's Compilation of DATA COMMUNICATIONS STANDARDS edited by Harold Folts & Harry Karp, 1978, second printing 1979: pp. 7–23, Recommendation V.3 CCITT; pp. 98–104, Recommendation V.25 CCITT; pp. 331–344, ISO Standard 646; pp. 352–373, ISO Standard 1745; pp. 374–399, ISO Standard 2022; pp. 400–403, ISO Standard 2110; pp. 413–422, ISO Standard 2628; pp. 697–726, EIA Standard RS-232-C; American National Standard, ANSI X3.28-1976, pp. 13–71.
"MC6860L", Motorola Semiconductors.
"MC6850", supra.
"MC6852", supra.
Pugh, Tim "Intelligent Terminal Implementation For The S-100 Bus" Dr. Dobb's Journal of Computer Calisthenics & Orthodontis, pp. 4–16.
"Vadic Operation And Service Manual For VA831B RS232C Adaptor", The Vadic Corporation, Manual No. 18008-019, Issue 1, Dec. 1977.
"Racal-Vadic VA831A/B Adapter Installation/Operation Manual", Racal-Vadic, Inc.; Publication No. 18008-041, Sep. 1980.
Sippl, Charles J. "Data Communications Dictionary", Van Nostrand Reinhold Company, pp. 17, 18, 92, 114, 115, 130, 131, 161 & 167.
"Basics Of Data Communications", Electronics Book Series, pp. 245–253.
Techo, Robert "Data Communications", Plenum Press, 1980, pp. 175–254.

(List continued on next page.)

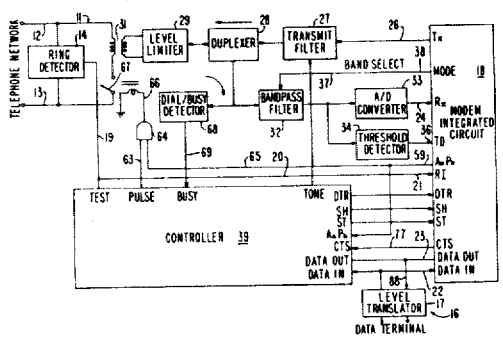

OTHER PUBLICATIONS

"Microprocessor Applications Manual", Motorola Semiconductor Products Inc., MC6850 ACIA.
"MC3870 Data Sheet", Motorola Semiconductor Products, Inc.
"MC6860 Data Sheet", Motorola Semiconductor Products, Inc.
"Low-Speed Modem System Design Using The MC6860", AN-747.
Sherman, Kenneth "Data Communications: A Users Guide", Reston Publishing Company, Inc., 1981, pp. 1–11; 44–99.
McShane, Thomas J. "Automatic Dialing For Computer Communications", *Computer Design*, Apr., 1974, pp. 146–149.
"ENVAX 1000 Operating Instructions", Vardon & Associates.
Instruction sheet entitled "Operating Instructions for ENVAX 1000 Micro-Communications Terminal".
"Communications Processor For Selectively Connecting A Computer Or Computer Peripheral To Any Of A Plurality of Transmission Lines", Patent application No. 962,170, filed Nov. 20, 1978 (unpublished).

*Primary Examiner*—David Y. Eng

[57] ABSTRACT

A modem is described for transmitting digitally coded information between an information distribution network and a data processing unit, which modem is responsive to modem control instructions provided by the very same keyboard input providing data transmission. The modem is capable of distinguishing modem control instructions from data transmission and includes such control functions as automatic telephone answering, automatic redialing of busy numbers, and an automatic escape sequence for terminating data transmission.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2–6, dependent on an amended claim, are determined to be patentable.

New claims 7 and 8 are added and determined to be patentable.

1. A modem for transmitting digitally coded data between an information distribution network and a data processing unit *wherein the modem is supplied with a selected escape signal which comprises an alpha numeric sequence* comprising:
   a modulator/demodulator for converting a signal providing digitally coded data in discrete voltage step level form to a modulated signal form suitable for transmission over said distribution network, and for converting [an] *a* modulated signal received from said distribution network representing digitally coded data into a discrete voltage step level form signal;
   first port means communicably connectable to said distribution network to place thereon analog signals representing digitally coded data and network control information, or receive therefrom analog signals representing digitally coded data and network status information;
   second port means communicably connectable to said data processing unit to provide serially thereto over the same lines a signal providing digitally coded data and network status information, or receive serially therefrom over the same lines a signal to be modulated representing digitally coded data, network control instructions, and modem control instructions;
   means in electronic communication with said first and second port means and with said modulator/demodulator for transmitting digitally coded information to be transmitted by said modem and received at one of said first and second port means, through said modulator/demodulator to the other of said first and second port means; and
   means in electronic communication with said transmitting means for controlling communication of digitally coded data between said first and second port means of said modem, which means is responsive to digitally coded modem control instructions received at one of said port means and includes:
   *means responsive to the selected escape signal for storing the selected escape signal;*
   means for segregating digitally coded modem control instructions received at said second port means serially with other digitally coded information received thereat from such other digitally coded information;
   means to compare digitally coded data being transmitted via said modem with [a] *the stored* selected escape signal;
   *means in electronic communication with said storing means for changing said stored selected escape signal;* and
   means responsive to a true comparison between transmitted information and said escape signal by terminating communication via said modem between said ports.

*7. A modem for transmitting digitally coded data between an information distribution network and a data processing unit, comprising;*
   *a modulator/demodulator for converting a signal providing digitally coded data in discrete voltage step level form to a modulated signal form suitable for transmission over said distribution network, and for converting a modulated signal received from said distribution network representing digitally coded data into a discrete voltage step level form signal;*
   *first port means communicably connectable to said distribution network to place thereon analog signals representing digitally coded data and network control information, or receive therefrom analog signals representing digitally coded data and network status information;*
   *second port means communicably connectable to said data processing unit to provide serially thereto over the same lines a signal providing digitally coded data and network status information, or receive serially therefrom over the same lines a signal to be modulated representing digitally coded data, network control instructions, and modem control instructions wherein the modem control instructions include a reprogram command and a supplied plural character escape sequence generated by the data processing unit;*
   *means in electronic communication with said first and second port means and with said modulator/demodulator for transmitting digitally coded information to be transmitted by said modem and received at one of said first and second port means, through said modulator/demodulator to the other of said first and second port means; and*
   *means in electronic communication with said transmitting means for controlling communication of digitally coded data between said first and second port means of said modem, which means is responsive to digitally coded modem control instructions received at one of said port means and includes:*
   *means for segregating digitally coded modem control instructions received at said second port means serially with other digitally coded information received thereat from such other digitally coded information;*
   *means for storing a plural character escape sequence;*
   *means coupled to the storing means and responsive to the reprogram command for reprogramming the storing means to contain the supplied plural character escape sequence;*
   *means to compare digitally coded data to be transmitted via said modem with the plural character escape sequence stored in the storing means; and*
   *means responsive to a true comparison between transmitted information and said plural character escape sequence by terminating communication via said modem between said ports.*

8. A modem for transmitting digitally coded data between an information distribution network and a data processing unit, comprising:
- a modulator/demodulator for converting a signal providing digitally coded data in discrete voltage step level form to a modulated signal form suitable for transmission over said distribution network, and for converting a modulated signal received from said distribution network representing digitally coded data into a discrete voltage step level form signal;
- first port means communicably connectable to said distribution network to place thereon analog signals representing digitally coded data and network control information, or receive therefrom analog signals representing digitally coded data and network status information;
- second port means communicably connectable to said data processing unit to provide serially thereto over the same lines a signal providing digitally coded data and network status information, or receive serially therefrom over the same lines a signal to be modulated representing digitally coded data, network control instructions, and modem control instructions wherein the modem control instructions include a reprogram command and a supplied plural character escape sequence generated by the data processing unit;
- means in electronic communication with said first and second port means and with said modulator/demodulator for transmitting digitally coded information to be transmitted by said modem and received at one of said first and second port means, through said modulator/demodulator to the other of said first and second port means; and
- means in electronic communication with said transmitting means for controlling communication of digitally coded data between said first and second port means of said modem, which means is responsive to digitally coded modem control instructions received at one of said port means and includes:
- means for segregating digitally coded modem control instructions received at said second port means serially with other digitally coded information received thereat from such other digitally coded information;
- means for storing a plural character escape sequence;
- means coupled to the storing means and responsive to the reprogram command for reprogramming the storing means to contain the supplied plural character escape sequence;
- means for listening to the digitally coded data which is being transmitted via said modem and for comparing said transmitted digitally coded data with the plural character escape sequence stored in the storing means; and
- means responsive to a true comparison between transmitted information and said plural character escape sequence by terminating communication via said modem between said ports.

* * * * *